United States Patent
Takasaki et al.

(10) Patent No.: US 9,556,801 B2
(45) Date of Patent: Jan. 31, 2017

(54) DRIVING FORCE CONTROL DEVICE AND DRIVING FORCE CONTROL METHOD

(71) Applicants: Asuka Takasaki, Toyota (JP); Kei Mashiki, Toyota (JP)

(72) Inventors: Asuka Takasaki, Toyota (JP); Kei Mashiki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 14/426,172

(22) PCT Filed: Dec. 6, 2013

(86) PCT No.: PCT/IB2013/002700
§ 371 (c)(1),
(2) Date: Mar. 5, 2015

(87) PCT Pub. No.: WO2014/091286
PCT Pub. Date: Jun. 19, 2014

(65) Prior Publication Data
US 2015/0233305 A1    Aug. 20, 2015

(30) Foreign Application Priority Data
Dec. 11, 2012 (JP) .................. 2012-270232

(51) Int. Cl.
*F02D 11/10* (2006.01)
*F02D 41/10* (2006.01)
*F02D 41/14* (2006.01)

(52) U.S. Cl.
CPC ............. *F02D 11/106* (2013.01); *F02D 41/10* (2013.01); *F02D 41/14* (2013.01)

(58) Field of Classification Search
CPC ...... Y02T 10/144; Y02T 10/44; Y02T 10/125; Y02T 10/42; F02D 41/0007; F02D 2250/22; F02D 41/04; F02D 2200/0402; F02D 11/106; F02D 41/14; F02D 41/10
(Continued)

(56) References Cited

U.S. PATENT DOCUMENTS

| 5,174,259 A * | 12/1992 | Shinzawa | F02D 41/0007 123/357 |
| 6,741,923 B2 * | 5/2004 | Katakura | B60K 31/0058 123/361 |

(Continued)

FOREIGN PATENT DOCUMENTS

| EP | 0 409 247 A2 | 1/1991 |
| EP | 1 384 875 A2 | 1/2004 |

(Continued)

OTHER PUBLICATIONS

May 2, 2014 Search Report issued in International Application No. PCT/IB2013/002700.

*Primary Examiner* — Joseph Dallo
(74) *Attorney, Agent, or Firm* — Oliff PLC

(57) ABSTRACT

A driving force control device includes a controller. The controller is configured to increase driving force of a vehicle in accordance with a driver's operation to request acceleration. The controller is configured to restrict subsequent increase of the actual driving force when it determines that increase of actual driving force of the vehicle stagnates, relative to required driving force determined according to at least the driver's operation to request acceleration. The controller is configured to restrict the increase of the actual driving force so that a rate of increase of the actual driving force is reduced as a stagnation period for which the increase of the actual driving force stagnates is longer.

11 Claims, 6 Drawing Sheets

(58) Field of Classification Search
USPC 123/357, 393, 434, 435, 672; 701/102–105, 115
See application file for complete search history.

(56) References Cited

U.S. PATENT DOCUMENTS

| | | | | |
|---|---|---|---|---|
| 6,971,367 | B2* | 12/2005 | Satou | F02D 11/105 123/350 |
| 8,423,262 | B2* | 4/2013 | Matsushita | F02D 29/02 123/406.23 |
| 2008/0114525 | A1* | 5/2008 | Sugimoto | F02P 5/1521 701/103 |
| 2008/0300768 | A1* | 12/2008 | Hijikata | F02D 11/105 701/102 |
| 2012/0101691 | A1* | 4/2012 | Otsuka | F02D 11/105 701/48 |
| 2014/0283514 | A1* | 9/2014 | Ibuki | F02D 23/02 60/605.2 |

FOREIGN PATENT DOCUMENTS

| | | |
|---|---|---|
| JP | 2007-064172 A | 3/2007 |
| JP | 2008-014281 A | 1/2008 |
| JP | 2010-024970 A | 2/2010 |
| WO | 89/05393 A1 | 6/1989 |

\* cited by examiner

| STAGNATION PERIOD : Δt | SHORT ⟷ LONG |
| --- | --- |
| CORRECTION AMOUNT OF REDUCTION : α | SMALL ⟷ LARGE |
| CORRECTION AMOUNT OF REDUCTION : β | LARGE ⟷ SMALL |

DRIVING FORCE CONTROL DEVICE AND DRIVING FORCE CONTROL METHOD

BACKGROUND OF THE INVENTION

1. Field of the Invention

The invention relates to a driving force control device that controls driving force of a vehicle, or the like, and also relates to a driving force control method.

2. Description of Related Art

It is known that in an internal combustion engine installed on a vehicle, such as an automobile, there is a delay in response of its output or power to a driver's operation. In the case where the engine is equipped with a turbocharger, in particular, even if the accelerator pedal is depressed in an operating region in which the flow rate of exhaust gas is small, the engine is not sufficiently supercharged until the exhaust flow rate is increased and the rotational speed of a turbine becomes equal to or higher than a given speed. As a result, the output of the internal combustion engine, or the driving force of the vehicle, rises with a delay of several seconds.

If the response of the driving force to the driver's operation to depress the accelerator pedal is delayed, the driver may feel that the driving force does not follow his/her own operation, and stagnates (or remains substantially constant); therefore, the driver may get a sense of strangeness or discomfort when the driving force rapidly rises due to subsequent increase of the boost pressure. Namely, the driving force rises in steps in response to the operation to depress the accelerator pedal, whereby the response delay is emphasized.

In connection with the problem of the delay in response as described above, a driving force control device as described in Japanese Patent Application Publication No. 2010-24970 (JP 2010-24970 A), for example, determines whether a stagnation period for which the driving force stagnates (i.e., remains substantially constant), due to a delay in response is equal to or longer than a set period, and restricts subsequent increase of the driving force if the stagnation period becomes equal to or longer than the set period, so as to alleviate the driver's sense of strangeness or discomfort. If the stagnation period is less than the set period, on the other hand, the control device does not restrict the driving force, so as to assure high acceleration performance of the vehicle.

In JP 2010-24970 A, when the vehicle is rapidly accelerated with a large amount of operation to request acceleration, it is assumed that the driver is less likely or unlikely to care about a step or sudden rise in the driving force; therefore, the period of time for determining stagnation of the driving force is set to a relatively long period, and the driving force is less likely to be restricted. When the vehicle is slowly accelerated, on the other hand, it is assumed that the driver is likely to get a sense of strangeness or discomfort against a step or sudden rise in the driving force; therefore, the period of time for determining stagnation is set to a relatively short period, and the driving force is more likely to be restricted.

SUMMARY OF THE INVENTION

In JP 2010-24970 A, the driving force is merely controlled to be more likely to be restricted or less likely to be restricted depending on the amount of the driver's operation to request acceleration, and the driving force is uniformly or equally reduced when it is restricted. Therefore, the driving force may be reduced more than necessary, and the acceleration performance and the driveability may deteriorate. To the contrary, if the driving force is not sufficiently reduced, the driver's sense of strangeness or discomfort may not be sufficiently eliminated.

The invention provides a driving force control device that restricts increase of driving force by an appropriate degree, after stagnation of the driving force due to a delay in response of a driving power source of a vehicle, or the like, so as to sufficiently alleviate the driver's sense of strangeness or discomfort while minimizing deterioration of the acceleration performance of the vehicle and the driveability. The invention also provides such a driving force control method.

A first aspect of the invention provides a driving force control device includes a controller configured to increase driving force of a vehicle in accordance with a driver's operation to request acceleration. The controller is configured to determine whether increase of actual driving force of the vehicle stagnates, relative to required driving force determined according to at least the driver's operation to request acceleration, and restrict subsequent increase of the actual driving force when the controller determines that the increase of the actual driving force stagnates. The controller is configured to restrict the increase of the actual driving force so that a rate of increase of the actual driving force is reduced as a stagnation period for which the increase of the actual driving force stagnates is longer.

According to the particular matters as described above, the required driving force is determined during traveling of the vehicle, according to the vehicle speed and the driver's operation to request acceleration, for example, and the driving force of the vehicle is increased by the driving force control device so as to follow the required driving force. If it is determined that the increase of the actual driving force of the vehicle stagnates to a predetermined extent or larger, due to a delay in output response of the internal combustion engine, such as a turbo lag, the controller restricts subsequent rapid increase of the driving force, so as to alleviate the driver's sense of strangeness or discomfort.

In view of the fact that, as the period of time for which the driving force stagnates or remains substantially constant is longer, the driver is more likely to get a sense of strangeness or discomfort against subsequent increase of the driving force, the controller sets the rate of subsequent increase of the driving force to a smaller value as the stagnation period is longer, so as to sufficiently alleviate the sense of strangeness or discomfort. On the other hand, if the stagnation period is relatively short, the driver will feel that the acceleration conforms with the driver's operation to request acceleration even if the driving force rises subsequent to the stagnation, and is less likely to get a sense of strangeness or discomfort. In this case, the controller does not reduce the rate of increase of the driving force so much, thus assuring sufficient acceleration performance.

Namely, the degree of restriction of the driving force after its stagnation is suitably controlled according to the length of the stagnation period, so that the driver's sense of strangeness or discomfort can be sufficiently alleviated, while minimizing deterioration of the acceleration performance of the vehicle and the driveability.

In the driving force control device as described above, when the controller determines that the increase of the actual driving force stagnates, the controller may be configured to once reduce the required driving force, and then gradually increases the required driving force, at a rate of change which is set to a smaller value as the stagnation period of the actual driving force is longer. Thus, the required driving force is once reduced, so that rapid increase of the actual driving force after its stagnation can be more reliably restricted, and the required driving force is then gradually increased, so that the actual driving force can be smoothly increased.

The rate of increase of the required driving force is set to a smaller value as the stagnation period of the driving force is longer and the driver is more likely to get a sense of strangeness or discomfort, so that the actual driving force can be more smoothly increased.

In the driving force control device as described above, the controller may be configured to increase an amount of reduction of the required driving force as the stagnation period of the actual driving force is longer. In this case, the required driving force is set to a smaller value as the driver is more likely to get a sense of strangeness or discomfort, so that the increase of the actual driving force can be restricted, with improved reliability.

In the driving force control device as described above, the controller may be configured to restrict the increase of the actual driving force, when the controller determines that the increase of the actual driving force stagnates, and that a likelihood that the actual driving force follows the required driving force is equal to or lower than a predetermined level. With this arrangement, the timing of restriction of the driving force can be appropriately determined, according to a stagnating condition of the driving force, so that the driving force changes more naturally from stagnation to increase, thus advantageously making the driver to get a sense of smooth acceleration that conforms with his/her operation.

In the driving force control device as described above, the controller may be configured to determine that the likelihood that the actual driving force follows the required driving force is equal to or lower than the predetermined level, when at least one of a condition that a deviation of the actual driving force from the required driving force is equal to or larger than a predetermined amount, a condition that a rate of change of the deviation is equal to or smaller than a predetermined value, and a condition that a rate of increase of the actual driving force is equal to or smaller than a predetermined value, is satisfied. In this manner, the situation where the driving force should be restricted can be more appropriately determined.

In the driving force control device as described above, the controller may be configured to determine that the increase of the actual driving force stagnates, when a deviation of the actual driving force from the required driving force is equal to or larger than a predetermined amount, and a rate of change of the required driving force and a rate of change of the actual driving force are equal to or smaller than respective predetermined values. In this manner, the situation where the driving force should be restricted can be appropriately determined.

A driving force control method according to a second aspect of the invention includes the steps of increasing driving force of a vehicle in accordance with a driver's operation to request acceleration, determining whether increase of actual driving force of the vehicle stagnates, relative to required driving force determined according to at least the driver's operation to request acceleration, and restricting subsequent increase of the actual driving force when it is determined that the increase of the actual driving force stagnates, so that a rate of increase of the actual driving force is reduced as a stagnation period for which the increase of the actual driving force stagnates is longer.

According to the driving force control device and method of the invention, when the increase of the driving force of the vehicle in response to the driver's operation stagnates to a predetermined extent or larger, subsequent increase of the driving force is restricted, and the degree of restriction of the driving force is suitably controlled according to the length of the stagnation period, so that the driver's sense of strangeness or discomfort can be sufficiently alleviated while minimizing deterioration of the acceleration performance of the vehicle and the driveability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings. In this embodiment, the invention is applied to a vehicle on which an internal combustion engine (which will also be called "engine") is installed as a drive power source.

Figure 1:
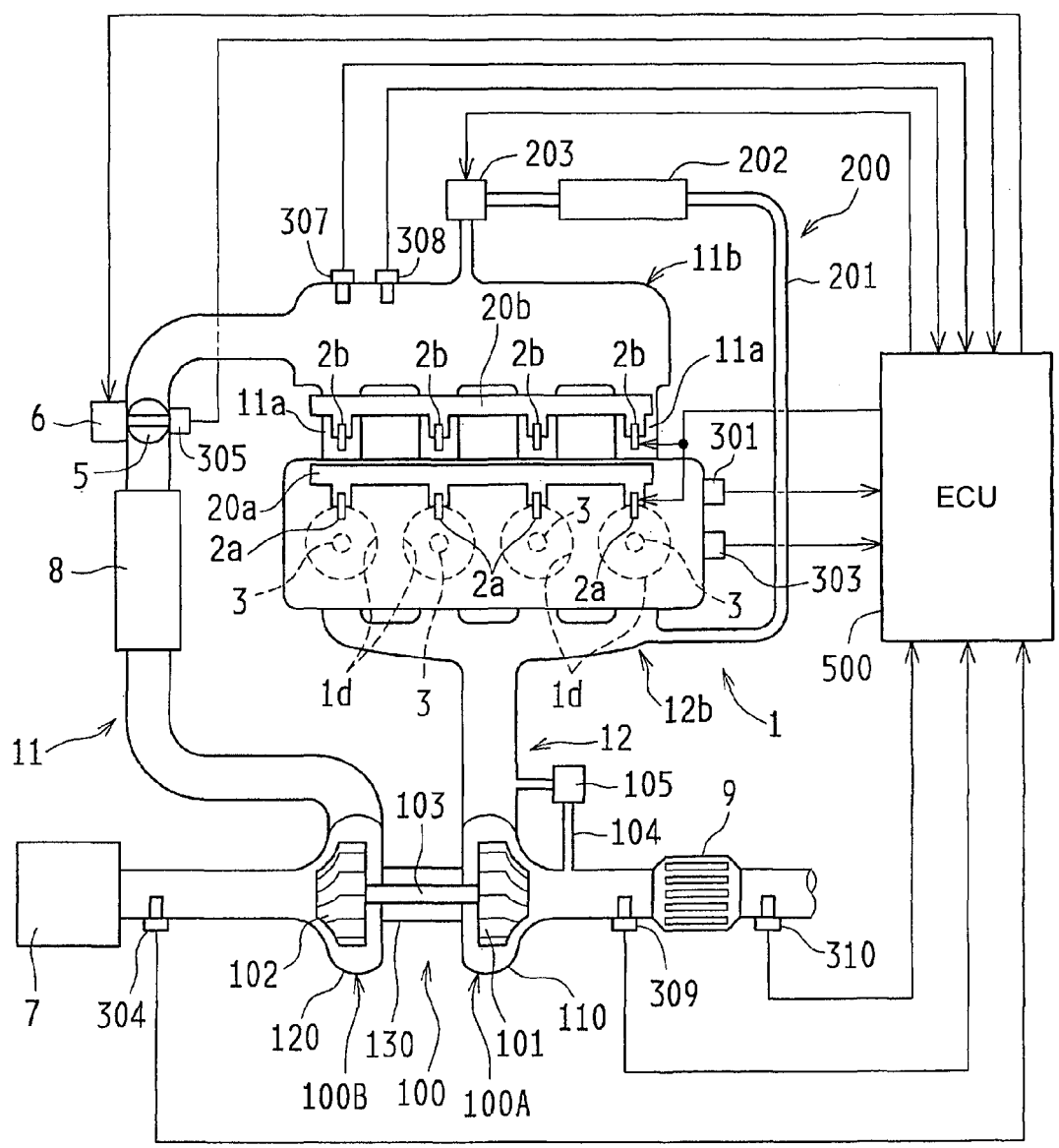
FIG. 1 is a view schematically showing the construction of one example of engine in a vehicle on which a driving force control device according to one embodiment of the invention is installed.
Figure 2:
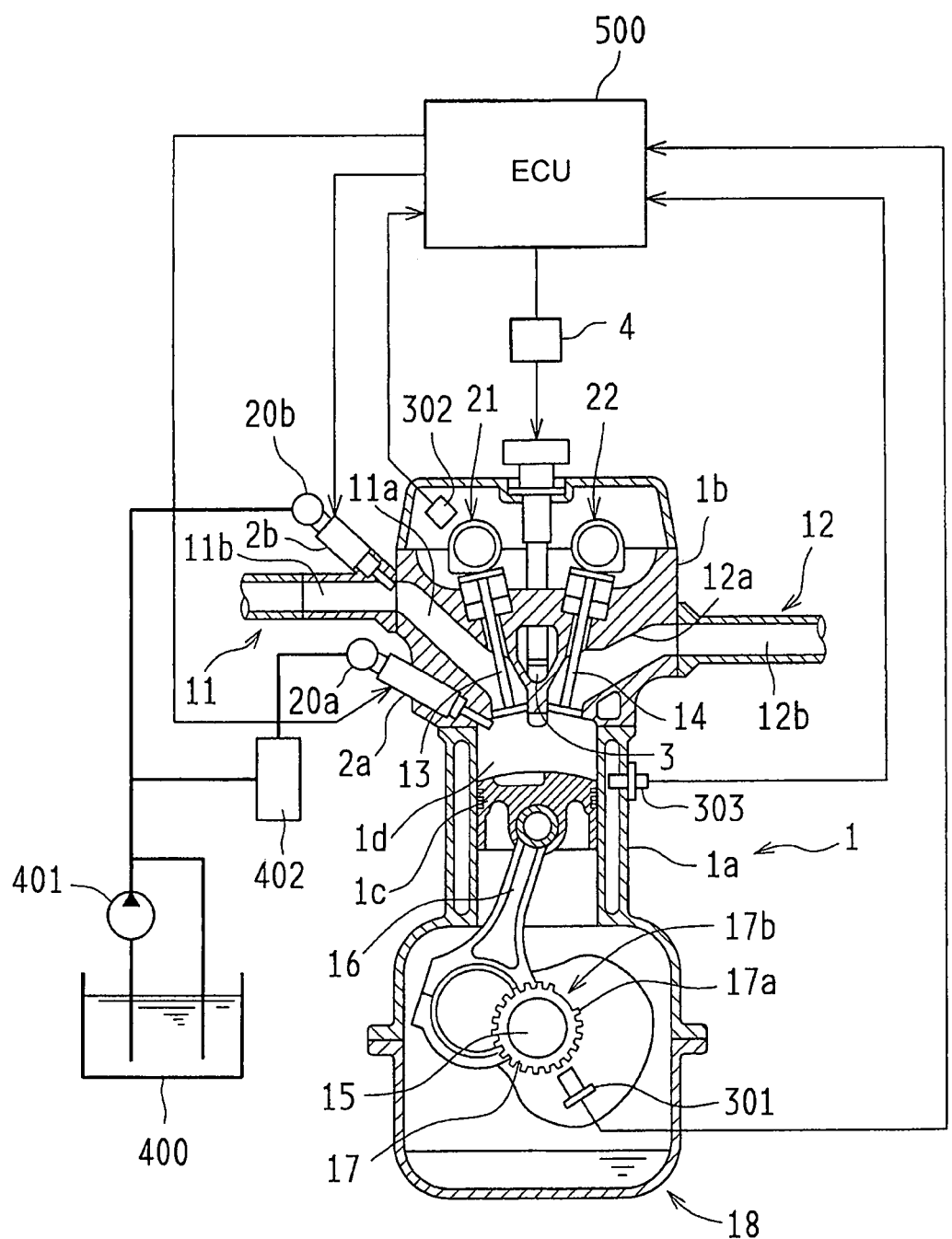
FIG. 2 is a view schematically showing the construction of only one cylinder of the engine of FIG. 1.

FIG. 1 and FIG. 2 schematically show the construction of the engine to which the invention is applied. In FIG. 2, the construction of only one cylinder of the engine is illustrated. In FIG. 2, a turbocharger and an EGR system are not illustrated.

The engine 1 of this embodiment is a four-cylinder gasoline engine installed on the vehicle, and a piston 1c that reciprocates in the vertical direction is provided in a cylinder block 1a that constitutes each of the cylinders. The piston 1c is connected to a crankshaft 15 via a connecting rod 16, and the reciprocating motion of the piston 1c is converted by the connecting rod 16, into rotation of the crankshaft 15.

A transmission (not shown) is coupled to the engine 1, and the rotation of the crankshaft 15 is transmitted from the transmission to drive wheels of the vehicle via a drive shaft, etc. A signal rotor 17 is mounted on the crankshaft 15. A plurality of teeth (projections) 17a are provided at equal angles (of 10° CA (crank angle), for example, in this embodiment) on an outer circumferential surface of the signal rotor 17. Also, the signal rotor 17 has a tooth missing portion 17b in which two teeth 17a are missing.

A crank position sensor (engine speed sensor) 301 that detects the crank angle is disposed beside the signal rotor 17. The crank position sensor 301 is an electromagnetic pick-up, for example, and generates a signal in the form of pulses (voltage pulses) corresponding to the teeth 17a of the signal rotor 17 when the crankshaft 15 rotates. The engine speed can be calculated from the output signal of the crank position sensor 301.

A coolant temperature sensor 303 that detects the temperature of engine coolant is disposed in the cylinder block 1a of the engine 1. A cylinder head 1b is provided on the upper end of the cylinder block 1a, and a combustion chamber 1d of each cylinder is formed between the cylinder head 1b and the piston 1c. An ignition plug 3 is disposed in the combustion chamber 1d of the engine 1. The ignition timing of the ignition plug 3 is controlled by an igniter 4. The igniter 4 is controlled by an ECU (Electronic Control Unit) 500 (corresponding to the controller) which will be described later.

An oil pan 18 that contains lubricant (engine oil) is provided in a lower portion of the cylinder block 1a of the engine 1. During operation of the engine 1, the lubricant stored in the oil pan 18 is pumped up by an oil pump (not shown), through an oil strainer that removes foreign matters from the lubricant, and is supplied to respective portions, such as the piston 1c, crankshaft 15, and the connecting rod 16, of the engine, so as to be used for lubrication, cooling, etc. of these portions. Then, after the lubricant thus supplied is used for lubrication, cooling, etc. of the respective portions of the engine, the lubricant is returned to the oil pan 18, and stored in the oil pan 18 until it is pumped up by the oil pump again.

An intake passage 11 and an exhaust passage 12 are connected to each combustion chamber 1d of the engine 1. A part of the intake passage 11 is formed by intake ports 11a corresponding to the respective combustion chambers 1d, and an intake manifold 11b. Also, a part of the exhaust passage 12 is formed by exhaust ports 12a corresponding to the respective combustion chambers 1d, and an exhaust manifold 12b.

In the intake passage 11, an air cleaner 7 that filters intake air (new air), an air flow meter 304, a compressor impeller 102 of a turbocharger 100 (which will be described later), an intercooler 8 for forcedly cooling the intake air whose temperature was raised by supercharging using the turbocharger 100, a throttle valve 5 for adjusting the intake air amount of the engine 1, etc. are disposed. Also, an intake air temperature sensor 307 and an intake manifold pressure sensor 308 are disposed in the intake passage 11 (in the intake manifold 11b).

The air flow meter 304 detects the intake air amount (new air amount). The intake air temperature sensor 307 detects the temperature (intake air temperature) of air that has been cooled by the intercooler 8 but has not been drawn into the engine 1. The intake manifold pressure sensor 308 detects the pressure in the intake manifold 11b, namely, the boost pressure (intake air pressure).

The throttle opening of the throttle valve 5 is controlled by the ECU 500 which will be described later. More specifically, the throttle opening of the throttle valve 5 is controlled so as to provide the optimum intake air amount suitable for operating conditions of the engine 1, such as the engine speed calculated from the output signal of the crank position sensor 301, and the amount of depression of the accelerator pedal (the accelerator operation amount Acc). Such a control system of the throttle valve 5 may also be called "electronic throttle system". The throttle opening may also be controlled independently of a driver's operation on the accelerator pedal.

An intake valve 13 is provided between the intake passage 11 and the combustion chamber 1d. With the intake valve 13 driven to be opened or closed, the intake passage 11 and the combustion chamber 1d are brought into communication with each other or shut off from each other. Also, an exhaust valve 14 is provided between the exhaust passage 12 and the combustion chamber 1d. With the exhaust valve 14 driven to be opened or closed, the exhaust passage 12 and the combustion chamber 1d are brought into communication with each other or shut off from each other. The intake valve 13 and the exhaust valve 14 are driven to be opened and closed, through rotation of an intake camshaft 21 and an exhaust camshaft 22, respectively, to each of which rotation of the crankshaft 15 is transmitted via a timing chain, or the like.

A cam position sensor 302 that generates a pulsed signal when the piston 1c of a particular cylinder (e.g., first cylinder #1) reaches the compression top dead center (TDC) is provided in the vicinity of the intake camshaft 21. The cam position sensor 302 is an electromagnetic pick-up, for example, and is positioned so as to be opposed to one tooth (not shown) on an outer circumferential surface of a rotor integrally provided on the intake camshaft 21. The cam position sensor 302 outputs a pulsed signal (voltage pulse) when the intake camshaft 21 rotates. Since the intake camshaft 21 (and the exhaust camshaft 22) rotate at a rotational speed that is one half of the rotational speed of the crankshaft 15, the cam position sensor 302 generates one pulsed signal each time the crankshaft 15 rotates twice (rotates 720°).

The piston position (whether the piston is on the intake stroke, compression stroke, explosion stroke, or the exhaust stroke) in each cylinder (of the first cylinder #1 through the fourth cylinder #4) can be recognized from the respective output signals of the cam position sensor 302 and the crank position sensor 30, and engine operation controls, such as the fuel injection control and the ignition timing control, can be accurately performed based on the piston position.

In the exhaust passage 12, on the other hand, a three-way catalyst 9 is disposed downstream (as viewed in the direction of exhaust flow) of a turbine wheel 101 of the turbocharger 100. In the three-way catalyst 9, CO and HC contained in exhaust gases emitted from the combustion chambers 1d into the exhaust passage 12 are oxidized, and NOx in the exhaust gas is reduced, so that CO, HC, and NOx are converted into $CO_2$, $H_2O$, and $N_2$ for clean-up of the exhaust gas.

An air-fuel ratio (A/F) sensor 309 is disposed in the exhaust passage 12 upstream (as viewed in the direction of exhaust flow) of the three-way catalyst 9. The air-fuel ratio sensor 309 shows a linear characteristic with respect to the air-fuel ratio. Also, an $O_2$ sensor 310 is disposed in the exhaust passage 12 downstream of the three-way catalyst 9. The $O_2$ sensor 310 generates electromotive force according to the oxygen concentration in the exhaust gas. It is determined that the exhaust gas is rich in oxygen when the output of the $O_2$ sensor 310 is higher than a voltage (comparative voltage) corresponding to the stoichiometric air-fuel ratio, and it is determined that the exhaust gas is lean in oxygen when the output of the $O_2$ sensor 310 is lower than the comparative voltage.

Next, a fuel injection system of the engine 1 will be described.

An injector for in-cylinder or direct injection (in-cylinder fuel injection valve) 2a capable of directly injecting fuel into each combustion chamber 1d is disposed in each cylinder of the engine 1. The direct-injection injectors 2a . . . 2a of the respective cylinders are connected to a common high-pressure-fuel delivery pipe 20a.

Also, an injector for port injection (intake passage fuel injection valve) 2b capable of injecting fuel into each intake port 11a is disposed in the intake passage 11 of the engine 1. The port-injection injector 2b is provided for each cylinder. The port-injection injectors 2b . . . 2b of the respective cylinders are connected to a common low-pressure-fuel delivery pipe 20b.

The supply of the fuel to the high-pressure-fuel delivery pipe 20a and the low-pressure-fuel delivery pipe 20b is effected by a feed pump 401 as a low-pressure pump and a high-pressure pump 402. The feed pump 401 pumps up fuel (such as gasoline) in a fuel tank 400, and supplies the fuel to the low-pressure-fuel delivery pipe 20b and the high-pressure pump 402. The high-pressure pump 402 pressurizes low-pressure fuel from the feed pump 401, and supplies the pressurized fuel to the high-pressure-fuel delivery pipe 20a.

The direct-injection injector 2a is an electromagnetically-driven shut-off valve, which is opened when a given voltage is applied thereto, so as to directly inject the fuel into the corresponding combustion chamber 1d. The opening and closing (injection duration, injection timing) of the direct-injection injector 2a are also duty-controlled by the ECU 500 which will be described later.

Similarly, the port-injection injector 2b is an electromagnetically-driven shut-off valve, which is opened when a given voltage is applied thereto, so as to inject the fuel into the corresponding intake port 11a. The opening and closing (injection duration, injection timing) of the port-injection injector 2b are also duty-controlled by the ECU 500.

With the fuel injected from one or both of the direct-injection injector 2a and the port-injection injector 2b, an air-fuel mixture of the fuel and air is formed in the combustion chamber 1d. The air-fuel mixture is ignited by the ignition plug 3, and burns and explodes so as to produce high-temperature, high-pressure combustion gas. The combustion gas thus produced causes the piston 1c to reciprocate, so that the crankshaft 15 is rotated to provide the driving force (output torque) of the engine 1. The combustion gas produced in the combustion chamber 1d is then discharged into the exhaust passage 12 when the exhaust valve 14 is opened.

In this embodiment, the engine 1 is equipped with the turbocharger (supercharger) 100 that supercharges intake air into the engine 1 by utilizing the exhaust pressure.

As shown in FIG. 1, the turbocharger 100 includes the turbine wheel 101 disposed in the exhaust passage 12, compressor impeller 102 disposed in the intake passage 11, and a coupling shaft 103 that couples the turbine wheel 101 with the compressor impeller 102 so that the turbine wheel 101 and the compressor impeller 102 rotate as a unit. In operation, the turbine wheel 101 disposed in the exhaust passage 12 rotates due to energy of exhaust gas, and the compressor impeller 102 disposed in the intake passage 11 rotates in accordance with the rotation of the turbine wheel 101. Then, the intake air is compressed due to rotation of the compressor impeller 102, and is forcedly fed into the combustion chamber 1d of each cylinder of the engine 1 (supercharging).

The turbine wheel 101 is housed in a turbine housing 110, and the compressor impeller 102 is housed in a compressor housing 120. The turbine housing 110 and the compressor housing 120 are mounted on the opposite sides of a center housing 130. The compressor impeller 102, the compressor housing 120, etc. constitute a compressor 100B, and the turbine wheel 101, the turbine housing 110, etc. constitute a turbine 100A.

In the turbocharger 100 of this embodiment, an exhaust bypass passage 104 that communicates the upstream side of the turbine wheel 101 with the downstream side thereof (i.e., bypasses the turbine wheel 101), and a waste gate valve (WGV) 105 that opens and closes the exhaust bypass passage 104 are provided. In operation, the boost pressure can be controlled by adjusting the opening of the waste gate valve (WGV) 104 so as to adjust the amount of exhaust gas that bypasses the turbine wheel 101. The opening of the waste gate valve 105 is also controlled by the ECU 500.

In this embodiment shown in FIG. 1, an EGR passage 201 extends from the exhaust manifold 12b to the intake manifold 11b, and an EGR cooler 202 provided in the EGR passage 201, EGR valve 203, etc. constitute an EGR (Exhaust Gas Recirculation) system 200. The EGR system 200 introduces, a part of the exhaust gas into the intake air, so as to lower the combustion temperature in the combustion chamber 1d, and thus reduce the amount of NOx generated.

Figure 3:
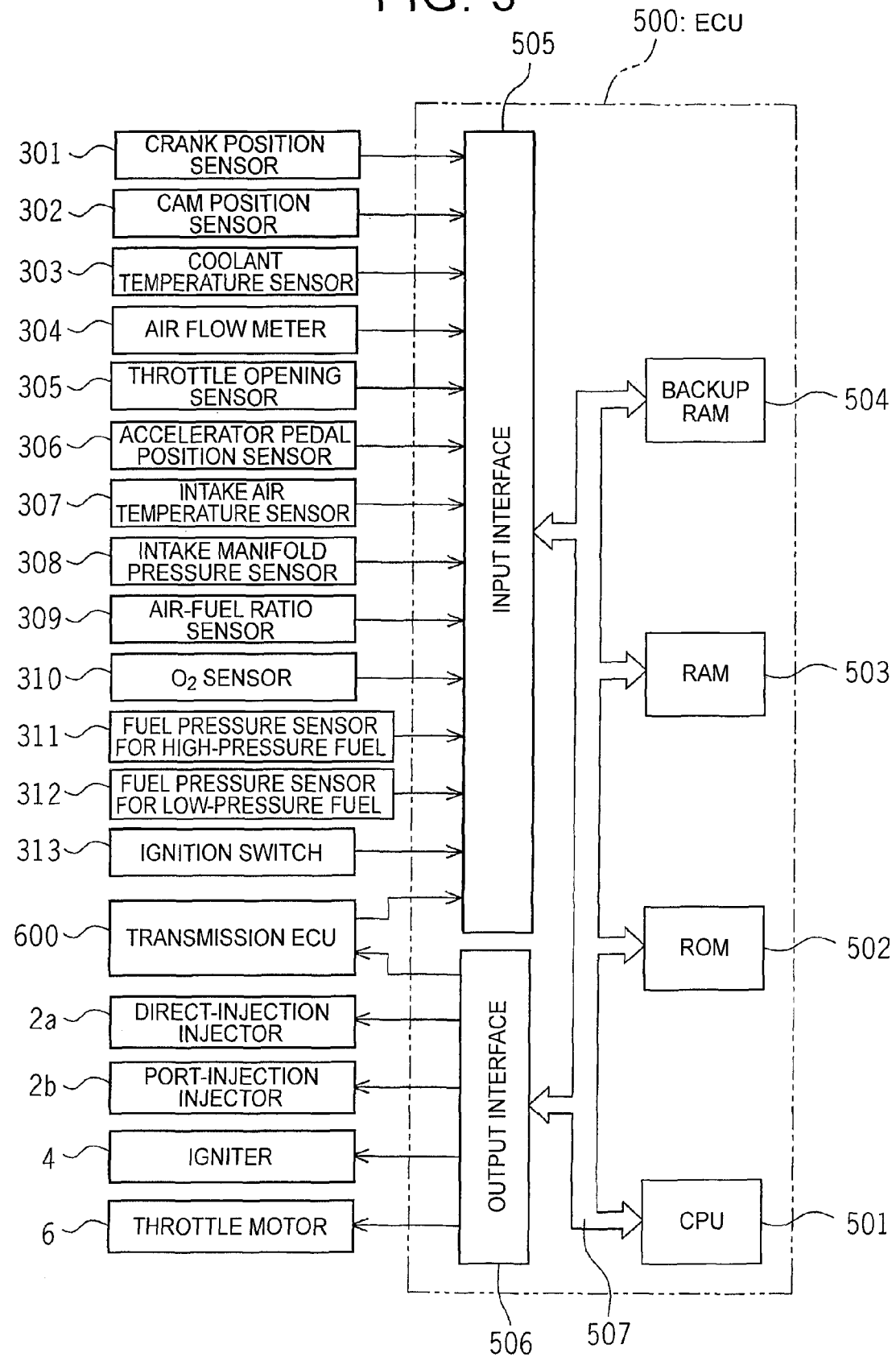
FIG. 3 is a block diagram showing one example of the configuration of the driving force control device, such as ECU, according to the embodiment of FIG. 1.

As shown in FIG. 3, the ECU 500 includes CPU (Central Processing Unit) 510, ROM (Read Only Memory) 502, RAM (Random Access Memory) 503, backup RAM 504, and so forth.

The ROM 502 stores various control programs, and maps, etc. referred to when the various control programs are executed. The CPU 501 performs various computations, based on the various control programs and maps stored in the ROM 502. The RAM 503 is a memory that temporarily stores the results of computations performed by the CPU 501, data received from respective sensors, and so forth, and the backup RAM 504 is a non-volatile memory that stores data, etc. to be stored when the engine 1 is stopped, for example.

The CPU 501, ROM 502, RAM 503 and the backup RAM 504 as described above are connected to each other via a bus 507, and are also connected to an input interface 505 and an output interface 506.

Various sensors are connected to the input interface 505. The sensors include the crank position sensor (engine speed sensor) 301, cam position sensor 302, coolant temperature sensor 303, air flow meter 304, throttle opening sensor 305, accelerator pedal position sensor 306, intake air temperature sensor 307, intake manifold pressure sensor 308, air-fuel ratio sensor 309, $O_2$ sensor 310, fuel pressure sensor 311 for high-pressure fuel, and a fuel pressure sensor 312 for low-pressure fuel. The accelerator pedal position sensor 306 outputs a detection signal corresponding to the accelerator operation amount Acc. The fuel pressure sensor 311 detects the pressure (fuel pressure) of the high-pressure fuel supplied to the direct-injection injectors 2a. The fuel pressure sensor 312 detects the pressure (fuel pressure) of the low-pressure fuel supplied to the port-injection injectors 2b. Also, an ignition switch 313 is connected to the input interface 505. When the ignition switch 313 is turned ON, cranking of the engine 1 by means of a starter motor (not shown) is started.

On the other hand, the direct-injection injectors 2a, port-injection injectors 2b, igniters 4 of the ignition plugs 3, and the throttle motor 6 of the throttle valve 5 are connected to the output interface 506. A transmission ECU 600 that performs control of the transmission is connected to both the input interface 505 and the output interface 506, and supplies and receives certain kinds of information to and from the ECU 500. For example, information of the vehicle speed V calculated from a signal received from an output rotation sensor of the transmission is supplied from the transmission ECU 600 to the ECU 500.

Then, the ECU 500 performs various controls of the engine, including the fuel injection amount control associated with the direct-injection injectors 2a and the port-injection injectors 2b, ignition timing control associated with the ignition plugs 3, and drive control (intake air amount control) of the throttle motor 6 of the throttle valve 5, based on the detection signals of the above-indicated various sensors and the information from the transmission ECU 600.

More specifically, the ECU 500 calculates required driving force Preq as driving force required to be applied to the vehicle, based on the accelerator operation amount Acc detected by the accelerator pedal position sensor 306, and the vehicle speed V supplied from the transmission ECU 600. Then, in order to produce engine torque corresponding to the required driving force Pref, the ECU 500 controls the throttle motor 6 of the throttle valve 5, and the direct-injection injector 2a and port-injection injector 2b of each cylinder, in view of the speed ratio as well, and applies current to the ignition plug 3 at a suitable time of ignition determined according to the operating state of the engine 1.

In addition, the ECU 500 performs driving force restriction control during acceleration as will be described below. The driving force control device including the controller according to the invention is implemented by a program executed by the ECU 500.

Next, driving force restriction control executed by the ECU 500 during acceleration (while the engine 1 is in an acceleration transient period) will be generally described. In the engine 1 including the turbocharger 100 as in this embodiment, even if the accelerator pedal is depressed in an operating region in which the flow rate of exhaust gas is small, sufficient supercharging may not be performed until rotation (or rotational speed) of the turbine wheel 101 rises due to increase of the exhaust flow rate. In this case, there may be a delay in response of several seconds, which corresponds to a period from the operation to depress the accelerator pedal to a rise of the output of the engine 1.

Figure 4:
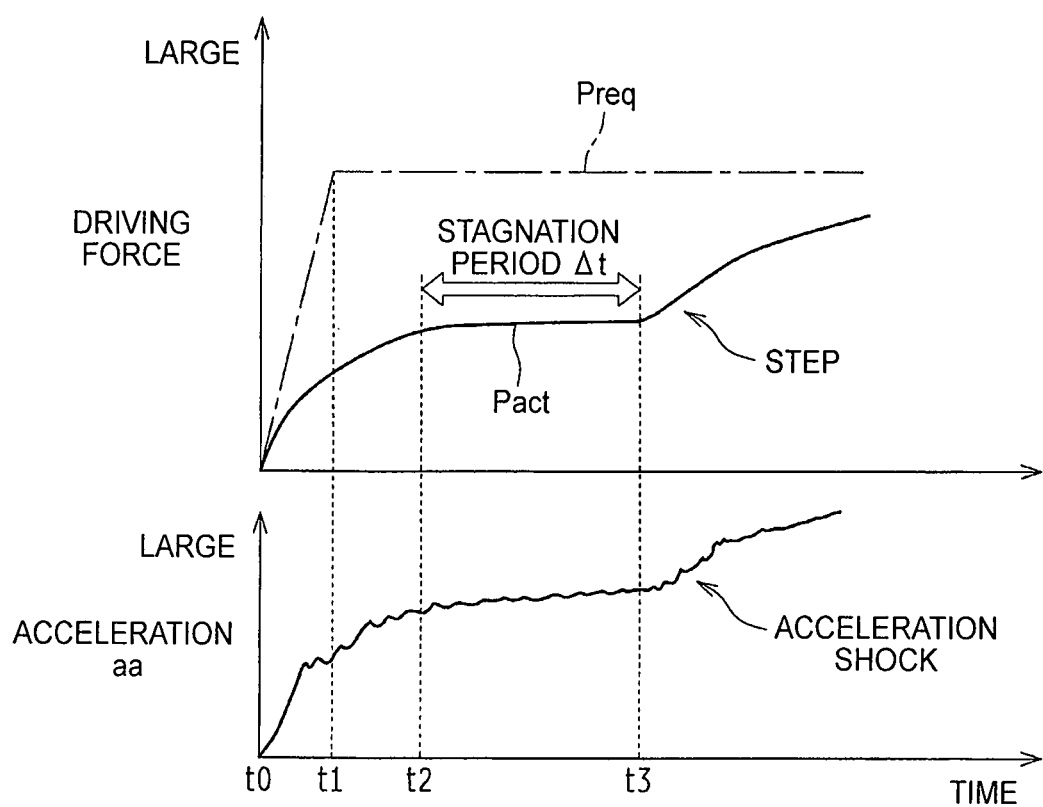
FIG. 4 is a timing chart showing changes in the required driving force, actual driving force, and the acceleration of the vehicle when the driving force is not restricted.

If the accelerator pedal is depressed at time t0 (i.e., if there is a request for acceleration), as shown in FIG. 4 as one example, the required driving force Preq rises in a step as indicated by a one-dot chain line; however, the actual driving force Pact of the vehicle does not rise so fast (there is a delay time) as indicated by a solid line, due to a delay (turbo lag) in increase of engine torque. Namely, the actual driving force Pac may not sufficiently increase for several seconds even though the driver keeps depressing the accelerator pedal (i.e., the required driving force Preq is constant).

The actual driving force Pact indicated by the solid line in FIG. 4, which is a value calculated based on the engine torque, in view of the speed ratio of the transmission and the reduction ratio of the differential, increases until time t2, but remains substantially constant (stagnates) during a subsequent period between time t2 and time t3. At this time, a value of acceleration aa (such as a differential value of the vehicle speed V, or a detection value of a G sensor), which represents driving force that actually acts on the vehicle, also remains substantially constant, like the calculated actual driving force Pact, and the driver who feels the acceleration aa may feel that the driving force of the vehicle does not follow his/her operation to depress the accelerator pedal, namely, the driving force stagnates.

Then, if the boost pressure rises at time t3 (not illustrated in FIG. 4), and the engine torque rapidly increases, the actual driving force Pact rises in steps as indicated by the solid line in FIG. 4, and the driver may feel acceleration shocks. Namely, the driver feels as if the driving force (acceleration aa) that has stagnated rises or increases in steps; therefore, the driver may get a sense of strangeness or discomfort due to a turbo lag thus emphasized.

In this embodiment, on the other hand, in a situation where the driving force stagnates (i.e., remains substantially constant) as described above, and its chance of following the required driving force Preq is supposed to be low, the subsequent increase of the driving force is restricted, so that the driver's sense of strangeness or discomfort is alleviated (driving force restriction control). Furthermore, the driving force is more tightly restricted as the turbo lag is larger and the stagnation period $\Delta t$ of the actual driving force Pact is longer, and the driving force is more loosely restricted as the stagnation period $\Delta t$ is shorter.

Figure 5:
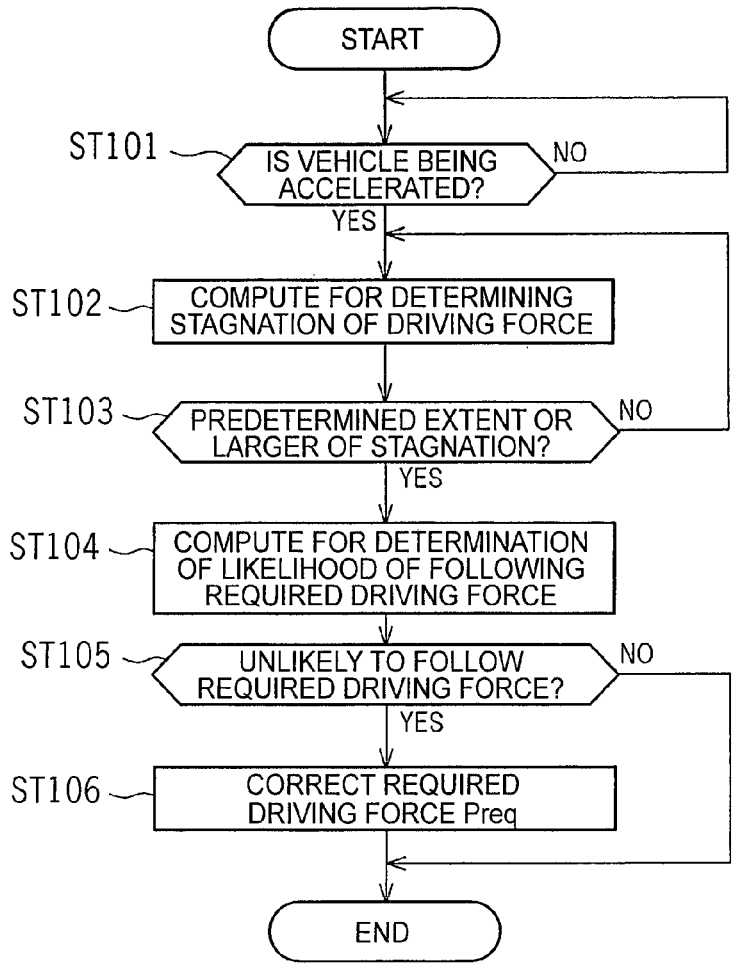
FIG. 5 is a flowchart illustrating the procedure of driving force restriction control according to the embodiment of the invention.

In the following, the driving force restriction control performed by the ECU 500 will be specifically described with reference to the flowchart of FIG. 5. A control routine shown in FIG. 5 is repeatedly executed by the ECU 500 at given time intervals (of, for example, several, tens of milliseconds).

Initially, in step ST101, it is determined whether the vehicle is being accelerated. More specifically, it is determined whether the amount of change of the accelerator operation amount Acc per unit time is equal to or larger than a predetermined acceleration determination threshold value. If a negative decision (NO) is made in step ST101, the control returns. If the amount of change of the accelerator operation amount Acc is equal to or larger than the acceleration determination threshold value, it is determined that the vehicle is being accelerated, namely, an affirmative decision (YES) is made, and the control proceeds to step ST102.

The acceleration determination threshold value may be set to an adequate value determined by experiment, calculation, or the like, in view of the model of the engine in question. For example, the acceleration determination threshold value may be set to 20%/sec to 30%/sec, and it may be determined whether the vehicle is being accelerated, based on the threshold value. However, the threshold value is not limited to within this range, but another numerical value may be employed. Also, the acceleration may be determined based on other engine operating conditions, such as the throttle opening obtained from the output signal of the throttle opening sensor 305, or may be determined by another known method.

In step ST102, computations for determining whether the increase of the driving force stagnates to a predetermined extent or larger are performed. More specifically, it is determined that "a predetermined extent or larger of stagnation" takes place when all of the following stagnation determination conditions are satisfied, for example. The stagnation determination conditions may include a first condition that (an absolute value of) a deviation of the actual driving force Pact from the required driving force Preq is equal to or larger than a predetermined value, a second condition that the rate of change of the required driving force Preq is equal to or smaller than a predetermined value, and there is little change in the required driving force Preq, and a third condition that the rate of change of the actual driving force Pact is also equal to or smaller than a predetermined value, and is very small.

The first condition means that a shortfall in the actual driving force Pact relative to the driver's request is equal to or larger than a predetermined amount. For example, if the actual driving force Pact remains 3000N even though the required driving force Preq is 5000N, for example, the absolute value of the deviation is 2000N, and it can be thus determined that the first condition is satisfied when the shortfall in the actual driving force Pact is equal to or larger than 2000N. The predetermined amount of shortfall is not limited to this numerical value, but may be set to an adequate value determined by experiment, calculation, or the like, in view of the model of the vehicle in question, the model of the engine in question, etc.

The second condition is used to determine that the range of fluctuation (increase/decrease) of the accelerator operation amount Acc is small, and the driver depresses the accelerator pedal with a will of his/her own. The third condition is used to determine that the actual driving force Pact is not increased so much even though the accelerator pedal is depressed. For example, it may be determined that the second condition is satisfied when the absolute value of the rate of change (the amount of change per unit time) of the required driving force Preq is equal to or smaller than 10%/sec, and it may be determined that the third condition is satisfied when the rate of increase (the amount of increase per unit time) of the actual driving force Pact is equal to or smaller than 15%/sec. It is, however, to be understood that the rate of change of the required driving force Preq and the rate of increase of the actual driving force Pact are not limited to these values, but may be set to respective adequate values determined by experiment, calculation, or the like, in view of the model of the vehicle in question, the model of the engine in question, etc.

Then, when the actual driving force Pact does not increase so much, and a deviation (absolute value) of the actual driving force Pact from the required driving force Preq remains large, even if the accelerator pedal is kept depressed, it is determined that the increase of the driving force stagnates to the predetermined extent or larger. Namely, it is determined in step ST103 whether all of the first through third conditions are satisfied. If any one of these conditions is not satisfied, a negative decision (NO) is made in step ST103, and the control returns to step ST102. If all of the conditions are satisfied, on the other hand, an affirmative decision (YES) is made in step ST103, and the control proceeds to step ST104.

In step ST104, a stagnation flag for measuring the stagnation period Δt of the driving force is set to ON, and computing for determining the likelihood of following the driving force as described below is performed. More specifically, a threshold value for determining the likelihood of following the required driving force Preq is calculated based on the rate of increase of the actual driving force Pact. Namely, if the rate of increase of the actual driving force Pact that stagnates as described above is further reduced, it is considered that the actual driving force Pact is unlikely to follow the required driving force Preq that largely differs from the actual driving force Pact. Therefore, the threshold value for determining the likelihood of following the driving force is set to be smaller than that of the third condition for determining the stagnation. For example, the rate of change of the actual driving force Pact as the threshold value may be set to 10%/sec.

It is, however, to be understood that the threshold value is not limited to the above-indicated numerical value, but may be set to an adequate value determined by experiment, calculation, or the like, in view of the model of the vehicle in question, the model of the engine in question, etc. Also, the likelihood of following the driving force is determined not only based on the rate of increase of the actual driving force Pact, but may also be determined depending on whether a difference (absolute value) between the current actual driving force Pact and the required driving force Preq is equal to or larger than a predetermined value, as well as the rate of increase of the actual driving force Pact. The determination may also be made based on the rate of reduction of the difference (absolute value) between the actual driving force Pact and the required driving force Preq, in place of the rate of increase of the actual driving force Pact.

Subsequently, in step ST105, it is determined whether the rate of increase of the actual driving force Pact is equal to or smaller than the threshold value for determining the likelihood of following the required driving force. If a negative decision (NO) is made in step ST105, the control routine is once finished. If the rate of increase of the actual driving force Pact is equal to or smaller than the threshold value for determining the likelihood of following the required driving force, it is determined that the actual driving force Pact is unlikely to follow the required driving force Preq, namely, an affirmative decision (YES) is made in step ST105. In this case, the control proceeds to step ST106 to correct the required driving force Preq in the manner as described below, so as to restrict the subsequent increase of the actual driving force Pact. Also, the stagnation flag is set to OFF at this point in time.

Figure 6:
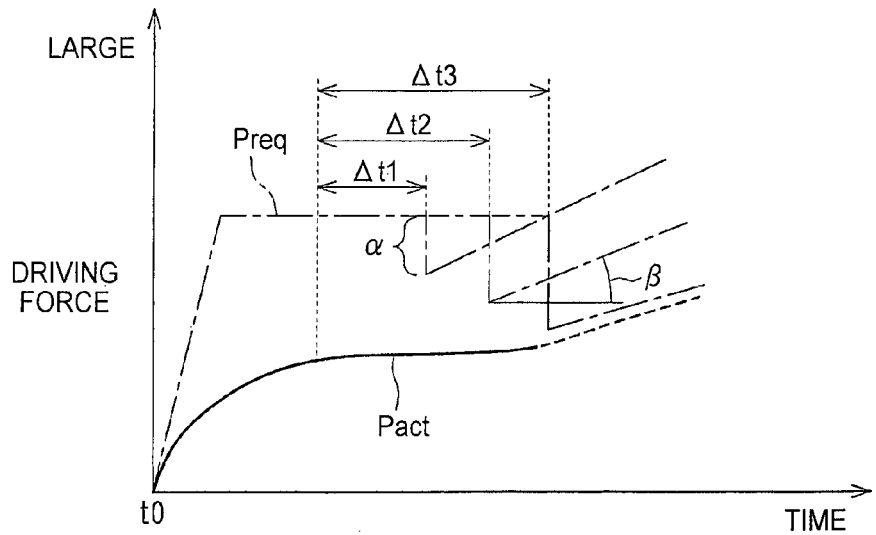
FIG. 6 is an explanatory view schematically showing correction of the required driving force under the driving force restriction control according to the embodiment of the invention.

In this embodiment, when the actual driving force Pact stagnates or remains substantially constant relative to the required driving force Preq, to the predetermined extent or larger, and it is determined that the actual driving force Pact is unlikely to follow the required driving force Preq, the required driving force Preq is corrected. More specifically, the required driving force Preq is initially reduced at a time by a given correction amount α of reduction, and then gradually increased at a given correction rate β of increase, as schematically shown in FIG. 6, for example.

With the required driving force Preq thus reduced once, the otherwise possible stepwise increase, of actual driving force Pact can be restricted, and the actual driving force Pact increases smoothly in accordance with the required driving force Preq that gradually increases after being once reduced. Thus, even if the driving force stagnates or remains substantially constant due to a turbo lag, the driver will get a sense of acceleration that conforms with the subsequent increase of the driving force, and the driver's sense of strangeness or discomfort can be sufficiently alleviated.

In this connection, the correction amount α of reduction of the required driving force Preq and the correction rate β of increase of the required driving force Preq may be set to respective adequate values determined by experiment, calculation, or the like, in view of the model of the vehicle in question, the model of the engine in question, etc. However, it is preferable to set the correction amount α of reduction, for example, so that the required driving force Preq becomes larger by a certain degree than the actual driving force Pact, so as to prevent overshooting of the control. In the example shown in FIG. 6, the correction amount α of reduction and the correction rate β of increase are changed according to the stagnation period Δt1-Δt3 that lasts until the driving force restriction control starts.

Namely, as the period of time for which the driving force stagnates or remains substantially constant after the driver's operation to depress the accelerator pedal is longer, the driver is more likely to get a sense of strangeness or discomfort against the subsequent increase of the driving force. Therefore, when the stagnation period Δt is relatively long (Δt3 in the example of FIG. 6), the driving force is relatively tightly restricted. More specifically, the amount of reduction α of the required driving force Preq is increased, so that the required driving force Preq is reduced down to a smaller value, and the rate of subsequent increase β of the required driving force Preq is also reduced, so that the increase of the actual driving force Pact is more reliably restricted.

On the other hand, when the stagnation period Δt is relatively short, e.g., is equal to Δt1, the driver feels that the acceleration conforms with his/her operation to depress the accelerator pedal even if the driving force rises slightly sharply after the stagnation, and the driver is less likely to get a sense of strangeness or discomfort. In this case, therefore, the driving force is relatively loosely restricted. More specifically, the amount of reduction α of the required driving force Preq is set to a relatively small value, and the rate of subsequent increase β of the required driving force Preq is set to a relatively large value, so that the driving force increases relatively rapidly, thus assuring sufficient acceleration performance of the vehicle.

Figures 7, 8:
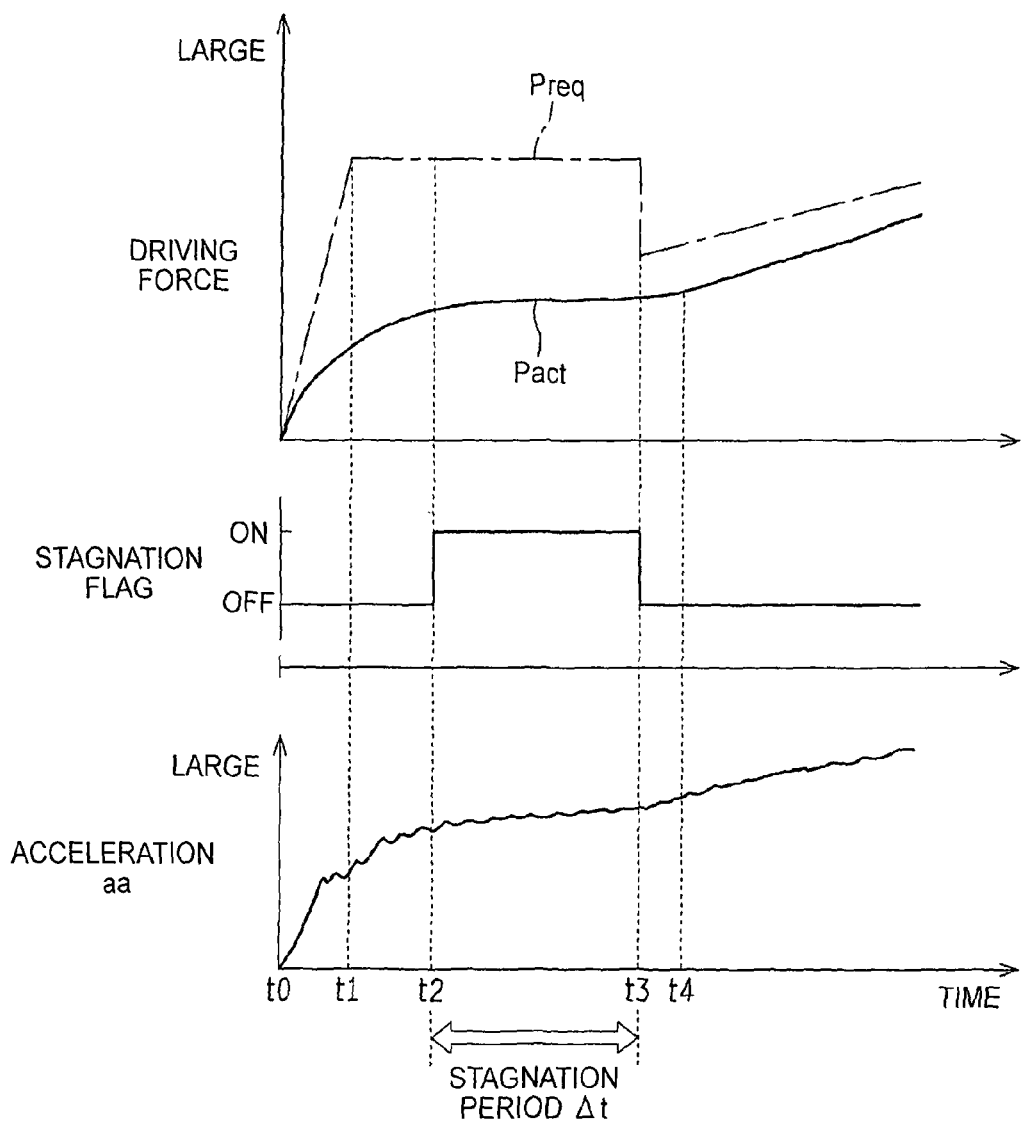
FIG. 7 is a view showing one example of map used in this embodiment for setting the correction amount of reduction of the required driving force and the correction rate of increase of the required driving force according to the stagnation period.
FIG. 8 is a view corresponding to FIG. 4, showing the case where the driving force restriction control according to the embodiment of the invention is performed.

In this embodiment, the required driving force Preq is not reduced so much if the stagnation period Δt is relatively short, while the required driving force Preq is reduced by a larger amount as the stagnation period Δt is longer. To this end, the reduction correction amount α and increase correction rate β are set to respective adequate values determined by experiment, calculation, or the like, in association with the stagnation period Δt of the driving force, and a map as shown in FIG. 7 by way of example is set. This map is stored in the ROM of the ECU 500, and is referred to when the driving force restriction control is performed.

Thus, the ECU 500 corrects the required driving force Preq according to the stagnation period Δt of the driving force, and changes the control target value of the engine torque according to the required driving force Preq thus corrected, so as to change the throttle opening, fuel injection amount, and ignition timing of the engine 1. In this manner, the increase of the engine torque after the delay in response is restricted, and the increase of the driving force of the vehicle after its stagnation is favorably restricted. One example of changes in the required driving force Preq, actual driving force Pact, and the acceleration aa of the vehicle, under the driving force restriction control, will be described with reference to the timing chart of FIG. 8.

Initially, if the accelerator pedal is depressed at time t0, the required driving force Preq rises in a step as indicated by a one-dot chain line, as in the case described above with reference to FIG. 4, but the actual driving force Pact of the vehicle does not rise so rapidly as indicated by a solid line. Although the required driving force Preq remains substantially constant in accordance with the accelerator operation amount Acc, during a period from time t1 to time t3, the actual driving force Pact does not increase so much, but stagnates.

At the time (time t1) when the rate of increase of the actual driving force Pact becomes equal to or smaller than a predetermined value (e.g., 15%/sec), a deviation (absolute value) of the actual driving force Pact from the required driving force Preq is equal to or larger than a predetermined value (e.g., 200N), and the rate of change of the accelerator operation amount Acc is equal to or smaller than a predetermined value (e.g., 10%/sec). Therefore, all of the first through third conditions for determination of stagnation are satisfied, and it is determined that the driving force stagnates to a predetermined extent or larger (the stagnation flag is set to ON).

At this time (time t2), however, the rate of increase of the actual driving force Pact has not become equal to or smaller than a threshold value (e.g., 10%/sec) for determination of the likelihood of following the required driving force, and therefore, the restriction control on the driving force is not started. Then, if the rate of increase of the actual diving force Pact is further reduced, and becomes equal to or smaller than the threshold value at time t3, it is determined that the actual driving force Pact is unlikely to follow the required driving force Preq, and the driving force restriction control is started. At this time, the stagnation flag is set to OFF.

If the driving force restriction control is started, the required driving force Preq is significantly reduced once, and then gradually increased as indicated in FIG. 8; thereafter, the engine torque does not rapidly increase even if the boost pressure rises. In the example of FIG. 8, the actual driving force Pact starts smoothly increasing at around time t4, and the acceleration aa of the vehicle also steplessly or smoothly increases in accordance with the increase of the actual driving force Pact. Thus, the driver is less likely or unlikely to feel acceleration shock.

Thus, according to the driving force control device of this embodiment, when it is determined that the increase of the actual driving force Pact stagnates to a predetermined extent or larger, relative to the required driving force Preq that increases upon acceleration of the vehicle, the required driving force Preq is corrected, so that the increase of the actual driving force Pact after the stagnation is restricted. As a result, the actual driving force Pact does not rise in steps after its stagnation, but gradually increases. Accordingly, even with the stagnation of the driving force, the driver is likely to feel that the vehicle acceleration conforms with his/her operation to depress the accelerator pedal, and is less likely or unlikely to get a sense of strangeness or discomfort.

Furthermore, the driving force is more tightly restricted as the stagnation period Δt of the driving force is longer, so that the actual driving force Pact increases at a slower rate (i.e., more slowly or gently), and the driving force is more loosely restricted as the stagnation period Δt is shorter, so that the actual driving force Pact increases relatively rapidly. Thus, the increase of the driving force is favorably restricted in accordance with the likelihood that the driver gets a sense of strangeness or discomfort, thus making it possible to sufficiently alleviate the driver's sense of strangeness or discomfort while minimizing deterioration of the acceleration performance of the vehicle and the driveability.

It is to be understood that the description of the illustrated embodiment is merely exemplary, and is not intended to limit the construction and application or use of the invention to those of the embodiment. In the illustrated embodiment, it is initially determined whether the actual driving force Pact stagnates to a predetermined extent or larger, and, if it is then determined that the actual driving force Pact is unlikely to follow the required driving force Preq, the subsequent increase of the driving force is restricted. However, this invention is not limited to this arrangement, but the increase of the driving force may be restricted when the predetermined extent or larger of stagnation of the actual driving force Pact is continued for a predetermined period of time or longer.

While the invention is applied to the vehicle on which a gasoline engine as one example is installed, in the illustrated embodiment, the invention is not limited to this application, but may be applied to vehicles on which other types of engines, such as a diesel engine, are installed. Also, the invention is not limitedly applied to the vehicle on which only the engine is installed as a driving power source, but may be applied to a hybrid vehicle (a vehicle on which an engine and an electric motor are installed as driving power sources), for example.

In developing the invention, it is particularly noted that the driver's likelihood of getting a sense of strangeness or discomfort due to subsequent increase of the driving force differs depending on the length of time for which the driver feels stagnation of the driving force. Thus, according to the invention, the driving force is more tightly restricted as the stagnation period is longer, whereas the driving force is more loosely restricted as the stagnation period is shorter. According to the invention, it is possible to sufficiently alleviate the driver's sense of strangeness or discomfort while minimizing deterioration of the acceleration performance and the driveability, by appropriately restricting the increase of the driving force subsequent to a delay in response of the driving power source of the vehicle. Thus, the invention is highly advantageous or effective particularly when it is applied to control of the driving force of a passenger car.

The invention claimed is:

1. A driving force control device comprising:
an electronic control unit configured to increase driving force of a vehicle in accordance with a driver's operation to request acceleration,
the electronic control unit being configured to determine whether increase of actual driving force of the vehicle stagnates, relative to required driving force determined according to at least the driver's operation to request acceleration, and restrict subsequent increase of the actual driving force when the electronic control unit determines that the increase of the actual driving force stagnates,
the electronic control unit being configured to determine that the increase of the actual driving force stagnates when (i) a deviation of the actual driving force from the required driving force is equal to or larger than a predetermined, amount (ii) a rate of change of the required driving force is equal to or smaller than a first predetermined value, and (iii) a rate of change of the actual driving force is equal to or smaller than a second predetermined value, and
the electronic control unit being configured to restrict the increase of the actual driving force such that a rate of increase of the actual driving force is reduced as a stagnation period for which the increase of the actual driving force stagnates is longer.

2. The driving force control device according to claim 1, wherein
when the electronic control unit determines that the increase of the actual driving force stagnates, the electronic control unit is configured to once reduce the required driving force, and
then the electronic control unit is configured to gradually increase the required driving force at a rate of change which is set to a smaller value as the stagnation period of the actual driving force is longer.

3. The driving force control device according to claim 2, wherein
the electronic control unit is configured to increase an amount of reduction of the required driving force as the stagnation period of the actual driving force is longer.

4. The driving force control device according to claim 1, wherein
the electronic control unit is configured to restrict the increase of the actual driving force, when the electronic control unit determines that the increase of the actual driving force stagnates, and that a likelihood that the actual driving force follows the required driving force is equal to or lower than a predetermined level.

5. The driving force control device according to claim 4, wherein
the electronic control unit is configured to determine that the likelihood that the actual driving force follows the required driving force is equal to or lower than the predetermined level, when at least one of a condition that a deviation of the actual driving force from the required driving force is equal to or larger than a predetermined amount, a condition that a rate of change of the deviation is equal to or smaller than a predetermined value, or a condition that a rate of increase of the actual driving force is equal to or smaller than a predetermined value, is satisfied.

6. A driving force control method, comprising:
increasing, by an electronic control unit, driving force of a vehicle in accordance with a driver's operation to request acceleration;
determining, by the electronic control unit, whether increase of actual driving force of the vehicle stagnates, relative to required driving force determined according to at least the driver's operation to request acceleration; and
restricting, by the electronic control unit, subsequent increase of the actual driving force when the electronic control unit determines that the increase of the actual driving force stagnates, such that a rate of increase of the actual driving force is reduced as a stagnation period for which the increase of the actual driving force stagnates is longer.

7. The driving force control method according to claim 6, further comprising:
once reducing, by the electronic control unit, the required driving force when the increase of the actual driving force stagnates; and
then gradually increasing, by the electronic control unit, the required driving force at a rate of change which is set to a smaller value as the stagnation period of the actual driving force is longer.

8. The driving force control method according to claim 7, further comprising:
increasing, by the electronic control unit, an amount of reduction of the required driving force as the stagnation period of the actual driving force is longer.

9. The driving force control method according to claim 6, further comprising:
restricting, by the electronic control unit, the increase of the actual driving force when the increase of the actual driving force stagnates, and a likelihood that the actual driving force follows the required driving force is equal to or lower than a predetermined level.

10. The driving force control method according to claim 9, wherein
the electronic control unit determines the likelihood that the actual driving force follows the required driving force is equal to or lower than the predetermined level, when at least one of a condition that a deviation of the actual driving force from the required driving force is equal to or larger than a predetermined amount, a condition that a rate of change of the deviation is equal to or smaller than a predetermined value, or a condition that a rate of increase of the actual driving force is equal to or smaller than a predetermined value, is satisfied.

11. The driving force control method according to claim 6, wherein the electronic control unit determines that the increase of the actual driving force stagnates, when a deviation of the actual driving force from the required driving force is equal to or larger than a predetermined amount, and a rate of change of the required driving force and a rate of change of the actual driving force are equal to or smaller than respective predetermined values.

* * * * *